(12) United States Patent
Beardsmore et al.

(10) Patent No.: US 9,942,243 B2
(45) Date of Patent: Apr. 10, 2018

(54) TAINT MECHANISM FOR MESSAGING SYSTEM

(71) Applicant: International Business Machines Corporation, Armonk, NY (US)

(72) Inventors: Anthony P. Beardsmore, Winchester (GB); Jonathan Levell, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 214 days.

(21) Appl. No.: 14/714,525

(22) Filed: May 18, 2015

(65) Prior Publication Data

US 2016/0344746 A1 Nov. 24, 2016

(51) Int. Cl.
*H04L 29/06* (2006.01)
*H04L 12/58* (2006.01)
*G06Q 10/10* (2012.01)

(52) U.S. Cl.
CPC ......... *H04L 63/123* (2013.01); *G06Q 10/107* (2013.01); *H04L 51/046* (2013.01); *H04L 51/08* (2013.01); *H04L 51/12* (2013.01); *H04L 51/30* (2013.01); *H04L 63/126* (2013.01); *H04L 63/0209* (2013.01)

(58) Field of Classification Search
CPC ... H04L 51/12; H04L 12/585; H04L 12/5855; G06Q 10/107
See application file for complete search history.

(56) References Cited

U.S. PATENT DOCUMENTS

| | | | |
|---|---|---|---|
| 7,694,328 B2 | 4/2010 | Joshi et al. | |
| 7,757,282 B2 | 7/2010 | Pandit et al. | |
| 8,224,902 B1* | 7/2012 | Glasser | H04L 51/12 709/206 |
| 8,510,827 B1 | 8/2013 | Leake et al. | |
| 9,065,842 B2* | 6/2015 | Vandervort | H04L 9/3247 |
| 2012/0215853 A1* | 8/2012 | Sundaram | H04L 63/126 709/206 |
| 2014/0047538 A1 | 2/2014 | Scott et al. | |
| 2016/0280370 A1* | 9/2016 | Canavor | B64C 39/024 |

OTHER PUBLICATIONS

Mell et al., "The NIST Definition of Cloud Computing," National Institute of Standards and Technology, Sep. 2011, p. 1-3, Special Publication 800-145.
Sarkar et al., "Taint Propagation in Database Systems," Tech Report—ECS 235 Project, 2009, 11 Pages.
Xu et al., "Practical Dynamic Taint Analysis for Countering Input Validation Attacks on Web Applications," Secure Systems Lab Technical Report, May 2005, p. 1-15, Stony Brook University Department of Computer Sciences.

* cited by examiner

*Primary Examiner* — Chirag R Patel
(74) *Attorney, Agent, or Firm* — Patricia B. Feighan

(57) ABSTRACT

A method for managing a plurality of messages associated with an online messaging system is provided. The method may include receiving a message from a messaging source. The method may also include determining whether the messaging source associated with the received message is trusted. The method may further include tagging the received message or storing the received message, wherein the tagging and the storing is based on the determination that the messaging source is not trusted. The method may additionally include validating the received message.

20 Claims, 7 Drawing Sheets

TAINT MECHANISM FOR MESSAGING SYSTEM

BACKGROUND

The present invention relates generally to the field of computers, and more particularly to online messaging systems.

Many data processing systems have to accept input from sources which are not trusted or from sources which require some validation before being allowed through to a secondary processing tier. Typically staging areas are used to perform this validation and avoid exposing sensitive systems to the 'outside world'. For example, systems running in a demilitarized Zone (DMZ). A DMZ is a conceptual network design where publicly accessible servers are placed on a separate, isolated network segment. The intention of a DMZ is to ensure that publicly accessible servers cannot contact other internal network segments, in the event that a server is compromised. Such solutions rely on extremely careful design, implementation, and maintenance to ensure that 'bad' data is never passed directly to systems which could be corrupted.

SUMMARY

According to one embodiment, a method for managing a plurality of messages associated with an online messaging system is provided. The method may include receiving a message from a messaging source. The method may also include determining whether the messaging source associated with the received message is trusted. The method may further include tagging the received message or storing the received message, wherein the tagging and the storing is based on the determination that the messaging source is not trusted. The method may additionally include validating the received message.

According to another embodiment, a computer system for managing a plurality of messages associated with an online messaging system is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving a message from a messaging source. The method may also include determining whether the messaging source associated with the received message is trusted. The method may further include tagging the received message or storing the received message, wherein the tagging and the storing is based on the determination that the messaging source is not trusted. The method may additionally include validating the received message.

According to yet another embodiment, a computer program product for managing a plurality of messages associated with an online messaging system is provided. The computer program product may include one or more computer-readable storage devices and program instructions stored on at least one of the one or more tangible storage devices, the program instructions executable by a processor. The computer program product may include program instructions to receive a message from a messaging source. The computer program product may also include program instructions to determine whether the messaging source associated with the received message is trusted. The computer program product may further include program instructions to tag the received message or storing the received message, wherein the tagging and the storing is based on the determination that the messaging source is not trusted. The computer program product may additionally include program instructions to validate the received message.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
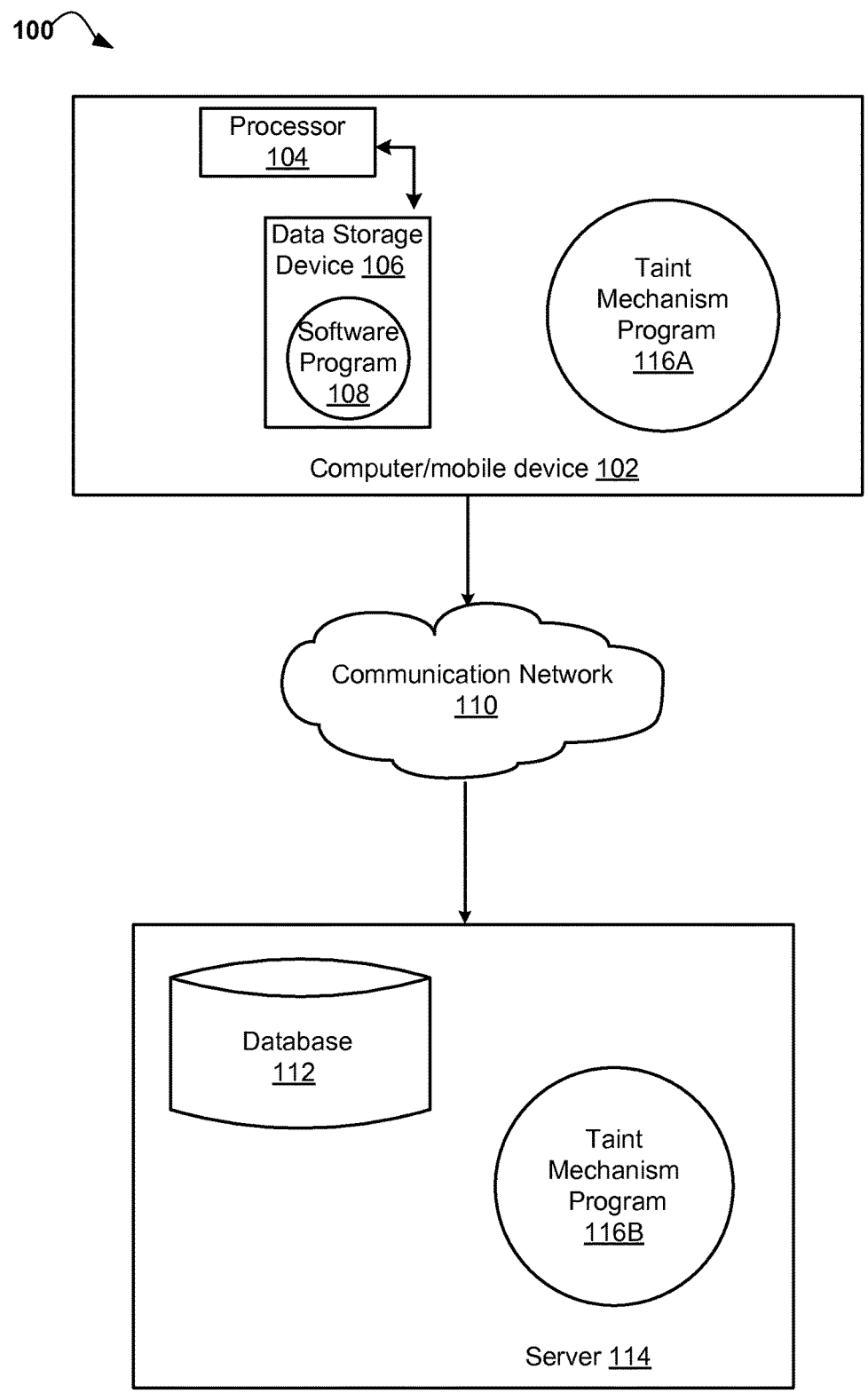
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of computers, and more particularly to online messaging systems. The following described exemplary embodiments provide a system, method and program product to, among other things, manage messages associated with a distributed online messaging system. Therefore, the present embodiment has the capacity to improve the technical field of online messaging systems by marking a message source as untrusted and tagging a message received from the untrusted message source as a 'tainted message'. More specifically, the present embodiment may either tag the message directly to signify the data in the message as not being validated or require that the message be stored in a 'tainted' data store.

As previously described, many data processing systems have to accept input from sources which may not be trusted or from sources which may require some validation before being allowed through to a secondary processing tier. Typically staging areas are used to perform this validation and avoid exposing sensitive systems to the 'outside world'. Such solutions rely on extremely careful design, implementation, and maintenance to ensure that 'bad' data is never passed directly to systems which could be corrupted. Currently, some runtime environments use a concept of 'taint' to ensure that in memory data is marked as untrusted and enforce particular validation. However, this concept has not been extended into a networked middleware or message passing layer. As such, it may be advantageous, among other things, to provide a way to extend the concept of 'tainted' data by applying the concept of 'tainted' to a networked middleware or message passing layer associated with an online messaging system.

According to at least one implementation, certain messaging sources (e.g. network connections, applications, or input queues/topics) may be marked by an administrator or automatically as 'untrusted'. Then, when a message arrives into the system from one of these untrusted' sources, the message may be 'tagged' so that all future handlers of this data are aware that the input has not been validated (i.e., the message is 'tainted').

Furthermore, according to at least one implementation, the application program interface (API) of the messaging system may be extended, such that applications retrieving messages may specify whether they wish to receive tainted messages or not (according to at least one implementation, the default behavior may be set to NOT). Thus, only applications which are explicitly coded to perform validation may set this value on the API, ensuring all other applications may be protected.

Many messaging systems, such as IBM®'s WebSphere MQ, have a concept of 'control' messages which can modify system behavior. Typically these messages are only read from particular message queues which are protected by appropriate authority checks. However, the concept of 'tainting' allows a further level of system protection since the command processors for these control messages may typically be configured to reject tainted messages.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product to manage messages associated with an online messaging system.

According to the present embodiment sources may be marked as trusted or untrusted. This may be an administrative activity dependent on the implementing product or may be performed automatically. As an example, in IBM®'s WebSphere MQ, this marking may be implemented as an attribute on the CHANNEL and QUEUE objects. As such, when a message arrives on a particular channel, or is placed on a particular queue, it may automatically be tagged as tainted if the source has previously been marked as untrusted.

Additionally, according to at least one implementation, the present embodiment may flag a message as tainted when a message is received from an untrusted source (i.e., a source that has been previously marked as being untrusted either manually by an administrator or automatically by the system). The method may flag a message as tainted by storing an attribute associated with the message as 'tainted'. For example, most messaging products and protocols include the concept of header data associated with an application messaging payload. Therefore, in one implementation of the present embodiment, the taint flag may be stored in a field in this header (e.g., message queue message descriptor (MQMD)) or a 'properties' field (e.g. java message service (JMS) properties, RFH2 header).

Additionally, according to at least one implementation, the present embodiment may prevent 'elevated' actions. As such, within the messaging system itself, any process which performs an 'action' on behalf of a message (as opposed to simply moving the message payload from one place to another) may be expected to reject tainted messages. This may include, but is not limited to, processes which may trigger external applications, modify configuration of objects (queues, channels etc.), modify security settings, or share topology information (e.g., MQ Cluster commands), etc.

Referring to FIG. 1, an exemplary networked computer environment 100 in accordance with one embodiment is depicted. The networked computer environment 100 may include a computer 102 with a processor 104 and a data storage device 106 that is enabled to run a software program 108, such as a web application (a web application is any software that runs in a web browser) and a Taint Mechanism Program 116A. The networked computer environment 100 may also include a server 114 that is enabled to run a Taint Mechanism Program 116B that may interact with a database 112 and a communication network 110. The networked computer environment 100 may include a plurality of computer 102 and servers 114, only one of which is shown. The communication network may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the Taint Mechanism Program 116B running on server computer 114 via the communications network 110. The communications network 110 may include connections, such as wire, wireless communication links, or fiber optic cables. As will be discussed with reference to FIG. 3, server computer 114 may include internal components 800a and external components 900a, respectively, and client computer 102 may include internal components 800b and external components 900b, respectively. Client computer 102 may be, for example, a mobile device, a telephone, a personal digital assistant, a netbook, a laptop computer, a tablet computer, a desktop computer, or any type of computing devices capable of running a program, accessing a network, and accessing a database 112. According to various implementations of the present embodiment, the Taint Mechanism Program 116A, 116B may interact with a database 112 that may be embedded in various storage devices, such as, but not limited to a computer 102, a networked server 114, or a cloud storage service.

As previously described, the client computer 102 may access the Taint Mechanism Program 116B, running on server computer 114 via the communications network 110. For example, a user using a client computer 102 may access the Taint Mechanism Program 116A, 116B, running on client computer 102, and server computer 114, respectively via the communications network 110. For example, a user using an application program 108 running on a client computer 102 may connect via a communication network 110 to the Taint Mechanism Program 116B which may be running on server computer 114. The Taint Mechanism Program 116A, 116B may be utilized to manage messages associated with an online messaging system by flagging a message as tainted, whereby the flagging includes storing an attribute (in headers or metadata) associated with the message as 'tainted'. The Taint Mechanism method is explained in more detail below with respect to FIGS. 2A-2C.

Figure 2A:
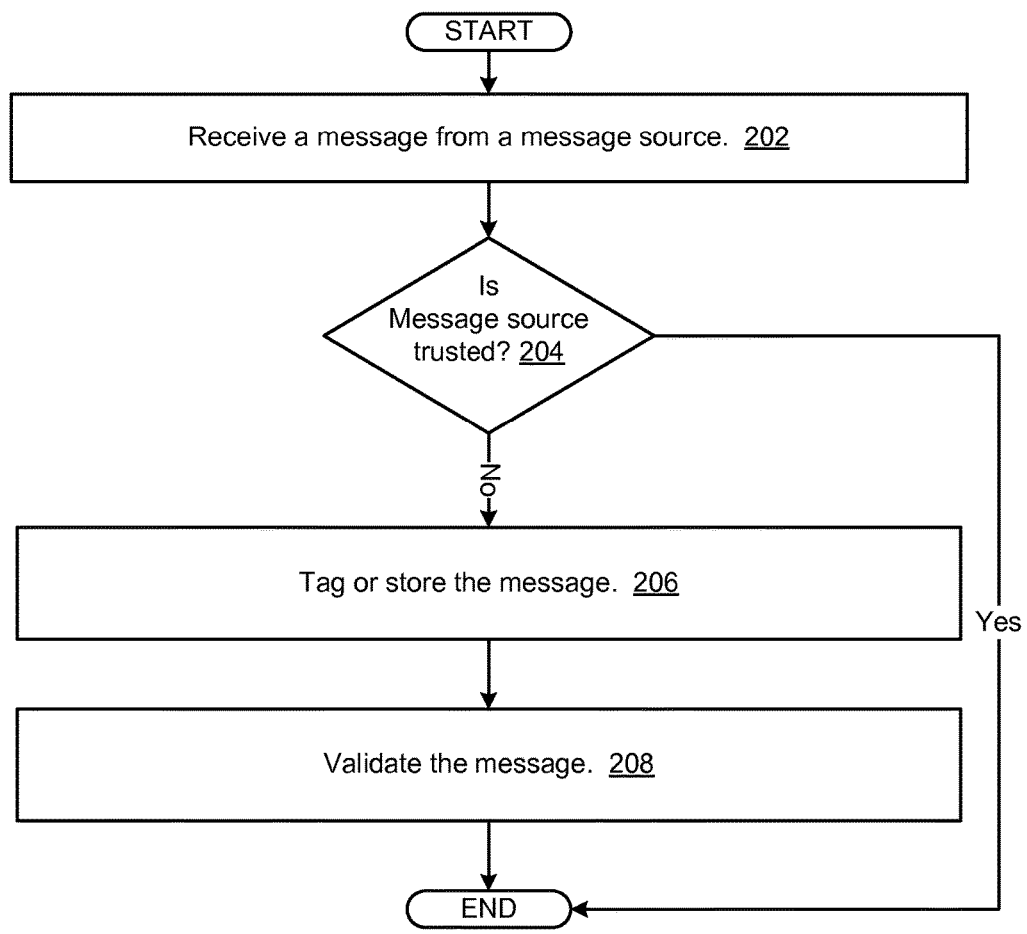
FIGS. 2A-2C are operational flowcharts illustrating the steps carried out by a program that provides a taint mechanism for messaging systems.
Figure 2B:
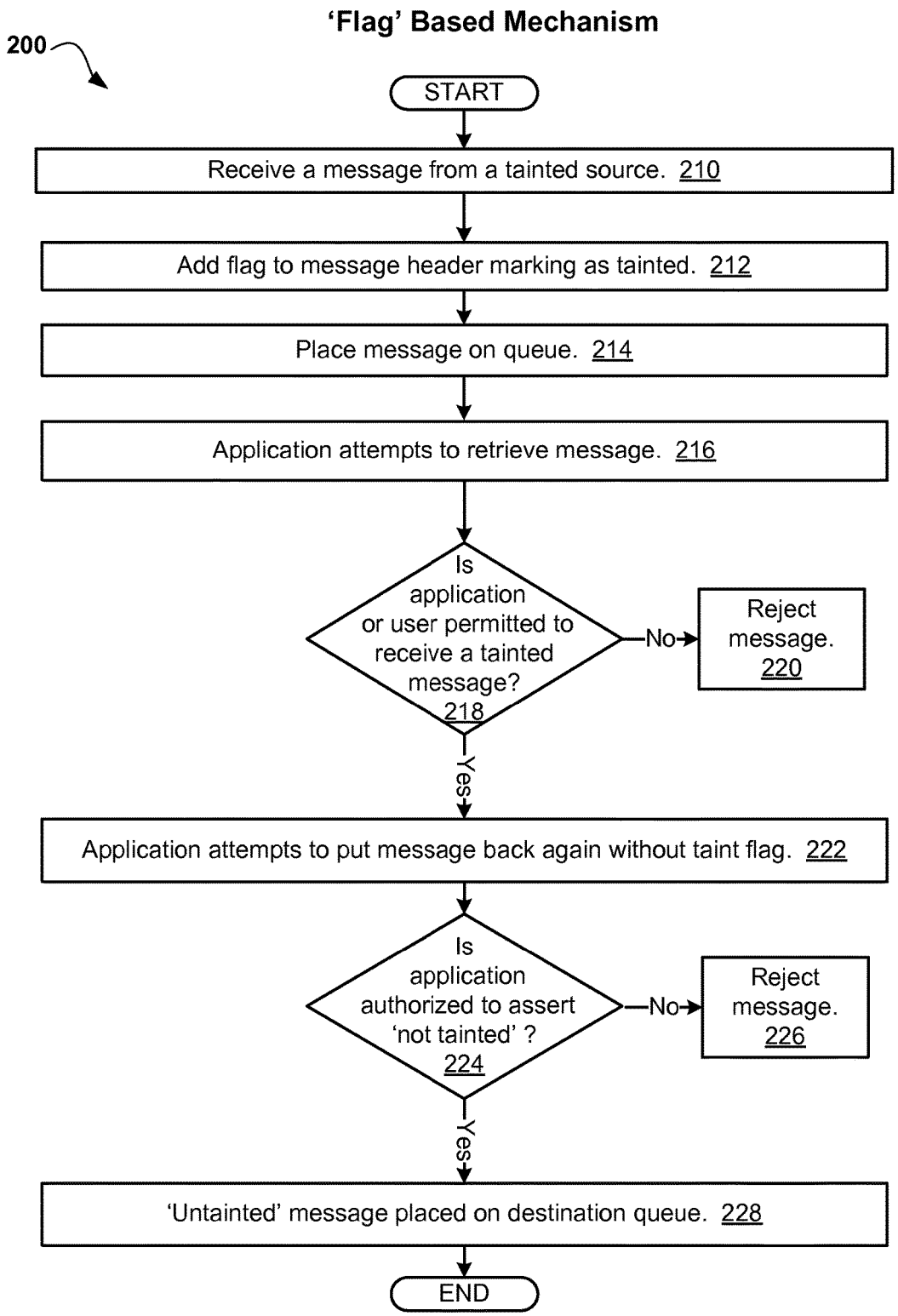
Figure 2C:
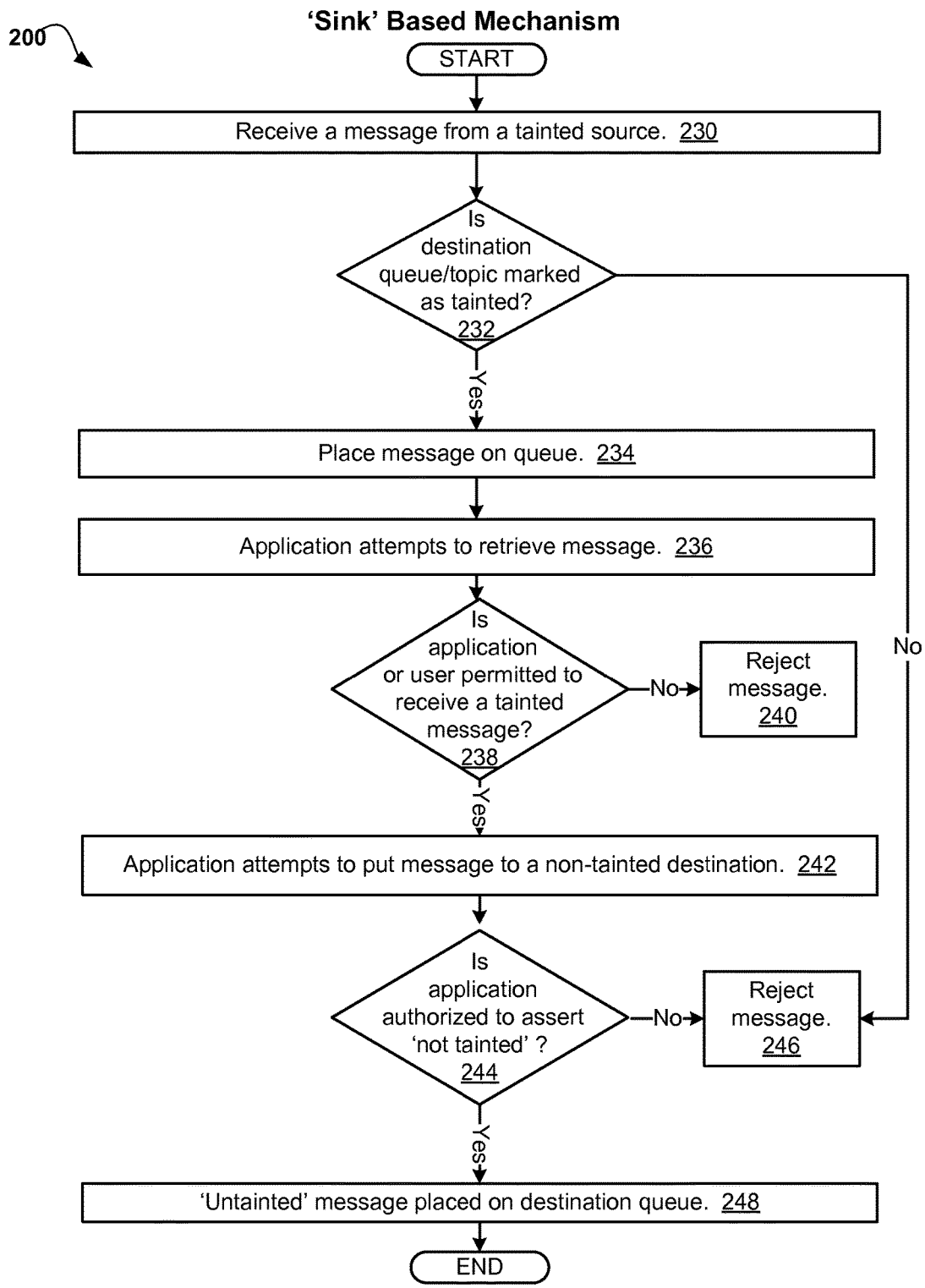

Referring now to FIGS. 2A-2C, operational flowcharts 200 illustrating the steps carried out by a program that manages messages associated with an online messaging system. As previously described, certain messaging sources (e.g. network connections, applications, or input queues/topics) may be marked (by an administrator or automatically) as 'untrusted'. Then, when a message arrives into the system (i.e., into the networked middleware or message passing layer associated with an online messaging system) from one of these 'untrusted' sources, the message is 'tagged' by the Taint Mechanism Program 116A, 116B (FIG. 1) so that all future handlers of this data are aware that the input has not been validated and thus, has been tagged as 'tainted'.

Therefore with respect to FIG. 2A at 202, the Taint Mechanism Program 116A, 116B (FIG. 1) receives a message from a message source. For example, the Taint Mechanism Program 116A, 116B (FIG. 1) may be implemented as an application program interface to an online messaging program and a message may be received from a source, such as a network connection, an application, or an input queue.

Then at 204, the Taint Mechanism Program 116A, 116B (FIG. 1) determines whether the message source is trusted. As previously described, an administrator may previously mark certain sources as 'untrusted' so that when the Taint Mechanism Program 116A, 116B (FIG. 1) intercepts a message on behalf of a messaging system, it will know that the source is untrusted. Alternatively, the present embodiment may automatically flag or mark a message source as 'untrusted' based on predetermined criteria as to which sources are considered untrusted.

Therefore, messages sources/sinks (e.g. Channels, Queues and Topics in IBM®'s WebSphere MQ terminology) may be configured by an administrator to automatically set the taint flag on any messages passing through them so that the Taint Mechanism Program 116A, 116B (FIG. 1) may know the source of the message has been marked untrusted when the message is received. For example, with respect to IBM®'s WebSphere MQ, this may be implemented as an attribute on the CHANNEL and QUEUE objects. As such, when a message arrives on a particular channel, or is placed on a particular queue, it may automatically be marked as tainted since the message source has been marked as being untrusted.

If at 204 it is determined that the message source is trusted, then the method may end. However, if at 204 it is determined that the message source is not trusted, then the method may continue to step 206 to tag the message from the untrusted source as 'tainted' or to store the message in a 'tainted' data store.

Therefore, at 206, the Taint Mechanism Program 116A, 116B (FIG. 1) either tags or stores the message. Thus, the message may be tagged directly to signify that the data in the message has not been validated and the message source has been designated as untrusted. All or most messaging products and protocols include the concept of header data associated with an application messaging payload. Therefore, in one implementation of the present embodiment, the taint flag may be stored in a field in this header (e.g., message queue message descriptor (MQMD)) or a 'properties' field (e.g. java message service (JMS) properties, RFH2 header) or in metadata associated with the received message.

Alternatively, the Taint Mechanism Program 116A, 116B (FIG. 1) may store the message in a 'tainted' data store or repository, such as database 112 (FIG. 1) to allow that some applications may function 'normally', carrying out transformations on data regardless of taint, while some applications can be protected from tainted data, and while others can be given authority to 'untaint' a message while retaining its identity and other properties.

Then at 208, the Taint Mechanism Program 116A, 116B (FIG. 1) validates the message data. According to at least one implementation, when the Taint Mechanism Program 116A, 116B (FIG. 1), on behalf of the application, chooses to accept the message with 'taint', the Taint Mechanism Program 116A, 116B (FIG. 1) may perform some processing (e.g., validation) to determine whether it is possible to sanitize or verify the tainted message is safe and put it back into the messaging system. Additionally, the Taint Mechanism Program 116A, 116B (FIG. 1) may choose whether to maintain or unset the 'taint' flag (assuming the application is itself allowed to put (i.e., transfer data) to a 'trusted' input source).

Referring now to FIG. 2B, a flowchart illustrating the steps for a 'flag' based mechanism approach in accordance with one embodiment is depicted. At 210, the Taint Mechanism Program 116A, 116B (FIG. 1) receives a message from a tainted source. As previously described, an administrator may previously mark certain sources as 'untrusted' so that when the Taint Mechanism Program 116A, 116B (FIG. 1) intercepts a message on behalf of a messaging system, it will know that the source is untrusted. Alternatively, the present embodiment may automatically flag or mark a message source as 'untrusted' based on predetermined criteria as to which sources are considered untrusted.

Then at 212, the Taint Mechanism Program 116A, 116B (FIG. 1) adds a flag to the message header marking the message as tainted. Next at 214, the Taint Mechanism Program 116A, 116B (FIG. 1) places the message on a destination queue, where at 216, an application attempts to retrieve the message.

Next at 218, it is determined whether the application or the user is permitted to receive a tainted message. According to at least one implementation, the actual check may be performed at source 'open' time.

If at 218 it is determined that the application or the user is not permitted to receive a tainted message, then the method may continue to step 220 to reject the message. However, if at 218 it is determined that the application or the user is permitted to receive a tainted message, then the method may continue to step 222 where the application attempts to put the message back again without the taint flag attribute.

Then at 224, it is determined whether the application is authorized to assert a message as 'not tainted'. If at 224 it is determined that the application is not authorized to assert a message as 'not tainted', then the method may continue to step 226 to reject the message. However, if at 224 it is determined that the application is authorized to assert a message as 'not tainted', then the method may continue to step 228 where the 'untainted' message is placed on the destination queue.

Referring now to FIG. 2C, a flowchart illustrating the steps for a 'destination' (i.e., 'sink') based mechanism approach in accordance with one embodiment is depicted. At 230, the Taint Mechanism Program 116A, 116B (FIG. 1) receives a message from a tainted source. As previously described, an administrator may previously mark certain sources as 'untrusted' so that when the Taint Mechanism Program 116A, 116B (FIG. 1) intercepts a message on behalf of a messaging system, it will know that the source is untrusted. Alternatively, the present embodiment may automatically flag or mark a message source as 'untrusted' based on predetermined criteria as to which sources are considered untrusted.

Then at 232, it is determined whether the destination queue or topic is marked as tainted. If at 232 it is determined that the destination queue or topic is not marked as tainted, then the method may continue to step 246 to reject the message.

However, if at 232 it is determined that the destination queue or topic is marked as tainted, then the method may continue to step 234 to place the message on the destination queue where at 236, an application attempts to retrieve the message.

Next at 238, it is determined whether the application or the user is permitted to receive a tainted message. According to at least one implementation, the actual check may be performed at source 'open' time.

If at 238 it is determined that the application or the user is not permitted to receive a tainted message, then the method may continue to step 240 to reject the message. However, if at 238 it is determined that the application or the user is permitted to receive a tainted message, then the method may continue to step 242 where the application attempts to put the message to a non-tainted destination queue.

Then at 244, it is determined whether the application is authorized to assert a message as 'not tainted'. If at 244 it is determined that the application is not authorized to assert a message as 'not tainted', then the method may continue to step 246 to reject the message. However, if at 244 it is determined that the application is authorized to assert a message as 'not tainted', then the method may continue to step 248 where the 'untainted' message is placed on the destination queue.

It may be appreciated that FIGS. 2A-2C provide only an illustration of one implementation and does not imply any limitations with regard to how different embodiments may be implemented. Many modifications to the depicted environments may be made based on design and implementation requirements.

As previously described, auditing or verifying software which has to deal with potentially malicious input may be difficult, time-consuming and an expensive job. As such, narrowing the scope of auditing required may therefore be extremely valuable. The present embodiment applies the concept of tainted data (data marked as untrusted or potentially damaging) from dynamic languages to a distributed messaging system. Applications in a distributed messaging system can conceptually be divided into three classes:

I) Applications that do not expect to be exposed to potentially malicious data;
II) Applications designed to accept potentially malicious data and sanitize or verify it is safe in some way and produce safe data ("gatekeeper applications"); and
III) Applications exposed to potentially malicious data, and whose output is untrusted.

According to at least one implementation, the present embodiment is designed to allow administrators, developers, or auditors to check into which category a given application falls within (as the categories are enforced by the messaging system) and therefore give sensitive code a higher level of scrutiny, testing, and validation.

"Gatekeeper applications" (i.e., category II above) are key to the integrity of the system and require most hardening and verification as they protect applications in category I (i.e., applications that do not expect to be exposed to potentially malicious data). However, applications in category I would be likely to contain most of the business logic (as they are protected by category II applications ("gatekeeper applications")) and need less rigorous checking of their handling of bad input. Category III applications are a middle ground since they are exposed to potentially malicious data. If the code that they use to interact with the messaging system had defects, then such data could cause them to crash or hang. However, no error in the application can cause category I messages to trust malicious data that has passed through them without a gatekeeper application vetting it first.

The present embodiment may be implemented in a number of implementations; however, two implementations are described below:

I. Storing Taint Status in the Message

The 'taint' status of a given message may be carried in headers or metadata (e.g. in MQ: the MQMD) which are transported with the message (this could even be stored in the message body itself (in MQ, a 'chained header', for example)). Then, new authority settings that can be applied to applications that process messages (or the user IDs under which those applications run) may be added to the system:

a) Permission to get messages which have the taint flag—(an implementation detail would be whether attempts to get tainted messages without this permission are ignored—moving on to the next available message if any—or trigger an error condition).
b) Permission to put messages without the taint flag set—(an implementation detail would be whether the system automatically sets it if the application does not have this permission, or whether the put is rejected).

However, by default, applications may have permission (b) (i.e., permission to put messages without the taint flag set), but not permission (a) (i.e., permission to get messages which have the taint flag) and would be category I applications (described above) which are not given tainted messages. An application which had permission (a) (i.e., permission to get messages which have the taint flag) but not permission (b) (i.e., permission to put messages without the taint flag set) may see tainted messages and can only produce tainted messages; and as such, the application would be a category III application (i.e., Applications exposed to potentially malicious data, and whose output is untrusted). An application with both of the new permissions is a gatekeeper application (i.e., category II) and thus treated as a more sensitive application in auditing and testing. A fourth category of application implicitly exists where neither permission being granted means an application can only read untainted messages. However, the application may produce either tainted or untainted messages (effectively a variant on category I) which are not given tainted messages.

Additionally, an extension to the present embodiment may be that message sources or sinks (e.g. Channels, Queues, and Topics in IBM®'s WebSphere MQ terminology) could be configured by an administrator to automatically set the taint flag on any messages passing through them. Therefore, applications putting messages into the system that do not have to be trusted would set the taint flag appropriately.

According to an alternate implementation, the present embodiment may replace the flag in the message data with a digital signature, such that only messages signed by an application with a chain of trust to an appropriate certificate authority may be considered untainted. The remainder of the system remains unchanged, i.e., applications which do not have permission to receive tainted message are only given untainted messages (those with a suitable digital signature). This variation may have advantages in that an attacker who manages to penetrate the messaging system and alter messages at rest (or otherwise subvert the system) still may not be able to affect which messages are tainted since this has now become a verifiable, cryptographically secure operation.

II. Storing Taint Status as a Property of Message Destinations

According to another implementation, the taint status may be considered a property of the 'message sink' (e.g. MQ Queue, Topic) rather than the message itself. In this variant implementation, applications or users may be given very similar permissions, but based upon access to the queues and topics rather than the individual messages as follows:
   a) Permission to open a tainted queue/topic (this may be subdivided into two authorities, open tainted for input/output)
   b) Permission to open an untainted queue/topic (this may also be subdivided into open for input/output)

Assuming only a general Yes/No for each class, rather than the separate input/output authorities, this may allow the original classes as follows:
   1. Category (I) (i.e., applications that do not expect to be exposed to potentially malicious data) is given (b) (i.e., permission to put messages without the taint flag set) only.
   2. Category (II) (i.e., applications designed to accept potentially malicious data and sanitize or verify it is safe in some way and produce safe data ("gatekeeper applications") is given (a) (i.e., permission to open a tainted queue/topic) and (b) (i.e., permission to put messages without the taint flag set).
   3. Category (III) (i.e., applications exposed to potentially malicious data, and whose output is untrusted) is given (a) (i.e., permission to open a tainted queue/topic) only.

Thus, using the approach of storing the taint status as a property of message destinations, the 'taint' is not explicitly associated with the message, but rather with the current location of that message.

Figure 3:
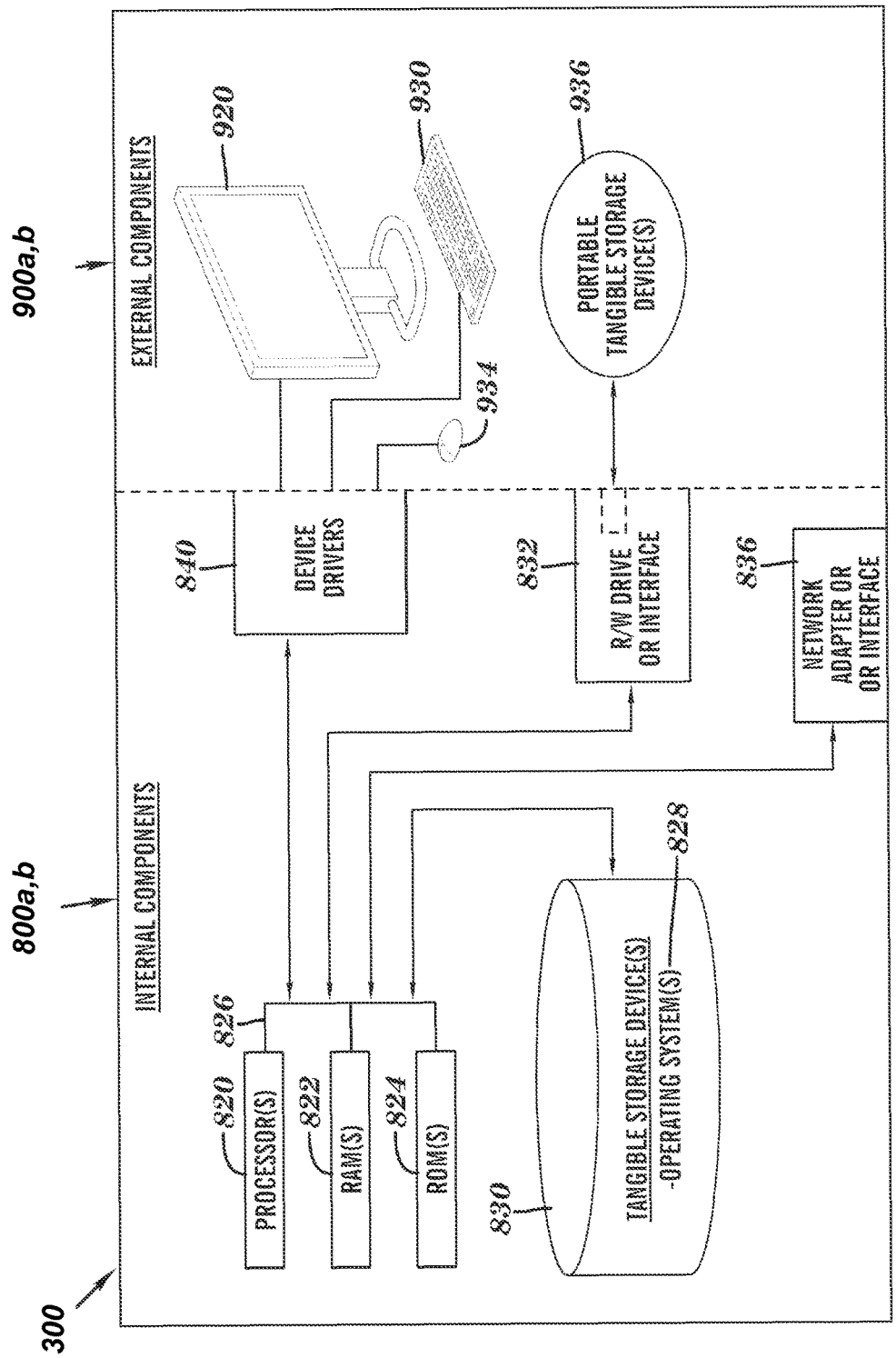
FIG. 3 is a block diagram of internal and external components of computers and servers depicted in FIG. 1 according to at least one embodiment.

FIG. 3 is a block diagram 300 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1) and network server 114 (FIG. 1) may include respective sets of internal components 800a,b and external components 900a,b illustrated in FIG. 3. Each of the sets of internal components 800 include one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and the Software Program 108 (FIG. 1) and the Taint Mechanism Program 116A (FIG. 1) in client computer 102 (FIG. 1) and the Taint Mechanism Program 116B (FIG. 1) in network server 114 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 3, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a,b also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as the Software Program 108 (FIG. 1) and the Taint Mechanism Program 116A, 116B (FIG. 1) can be stored on one or more of the respective portable computer-readable tangible storage devices 936, read via the respective R/W drive or interface 832 and loaded into the respective hard drive 830.

Each set of internal components 800a,b also includes network adapters or interfaces 836 such as a TCP/IP adapter cards, wireless Wi-Fi interface cards, or 3G or 4G wireless interface cards or other wired or wireless communication links. The Software Program 108 (FIG. 1) and the Taint Mechanism Program 116A (FIG. 1) in client computer 102 (FIG. 1) and the Taint Mechanism Program 116B (FIG. 1) in network server 114 (FIG. 1) can be downloaded to client computer 102 (FIG. 1) and network server 114 (FIG. 1) from an external computer via a network (for example, the Internet, a local area network or other, wide area network) and respective network adapters or interfaces 836. From the network adapters or interfaces 836, the Software Program 108 (FIG. 1) and the Taint Mechanism Program 116A (FIG. 1) in client computer 102 (FIG. 1) and the Taint Mechanism Program 116B (FIG. 1) in network server 114 (FIG. 1) are loaded into the respective hard drive 830. The network may comprise copper wires, optical fibers, wireless transmission, routers, firewalls, switches, gateway computers and/or edge servers.

Each of the sets of external components 900a,b can include a computer display monitor 920, a keyboard 930, and a computer mouse 934. External components 900a,b can also include touch screens, virtual keyboards, touch pads, pointing devices, and other human interface devices. Each of the sets of internal components 800a,b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
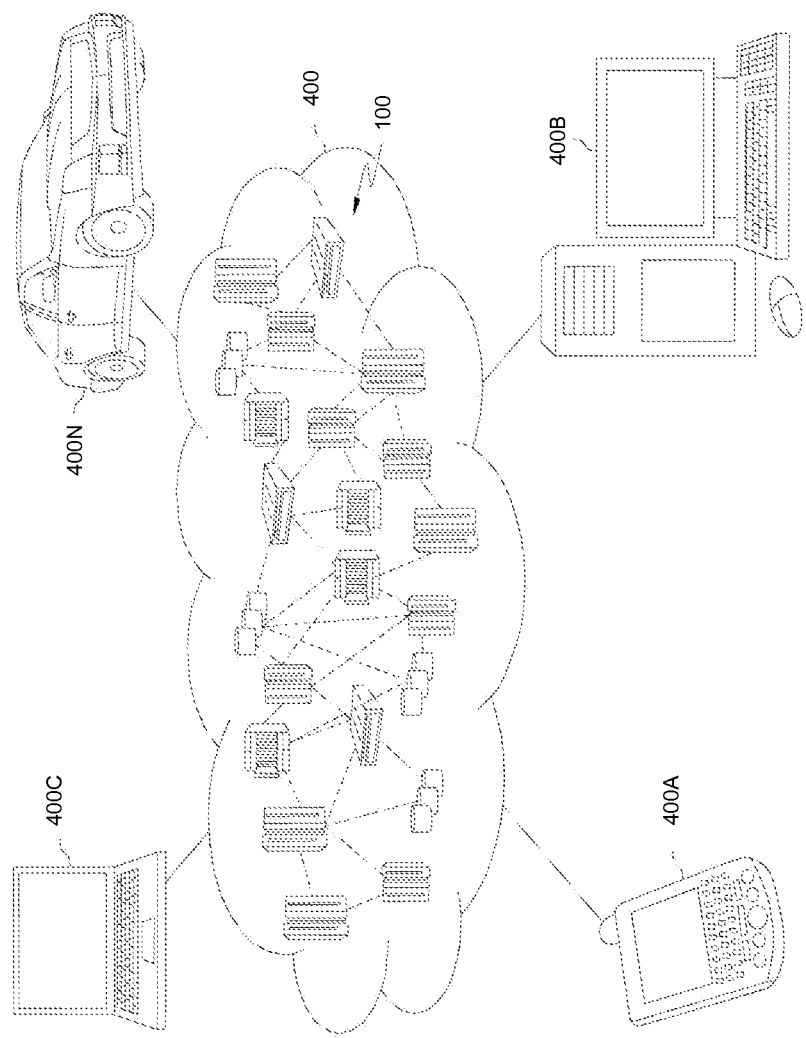
FIG. 4 is a block diagram of an illustrative cloud computing environment including the computer system depicted in FIG. 1, in accordance with an embodiment of the present disclosure.

Referring now to FIG. 4, illustrative cloud computing environment 400 is depicted. As shown, cloud computing environment 400 comprises one or more cloud computing nodes 100 with which local computing devices used by cloud consumers, such as, for example, personal digital assistant (PDA) or cellular telephone 400A, desktop computer 400B, laptop computer 400C, and/or automobile computer system 400N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 400A-N shown in FIG. 4 are intended to be illustrative only and that computing nodes 100 and cloud computing environment 400 can communicate with any type of computerized device over any type of network and/or network addressable connection (e.g., using a web browser).

Figure 5:
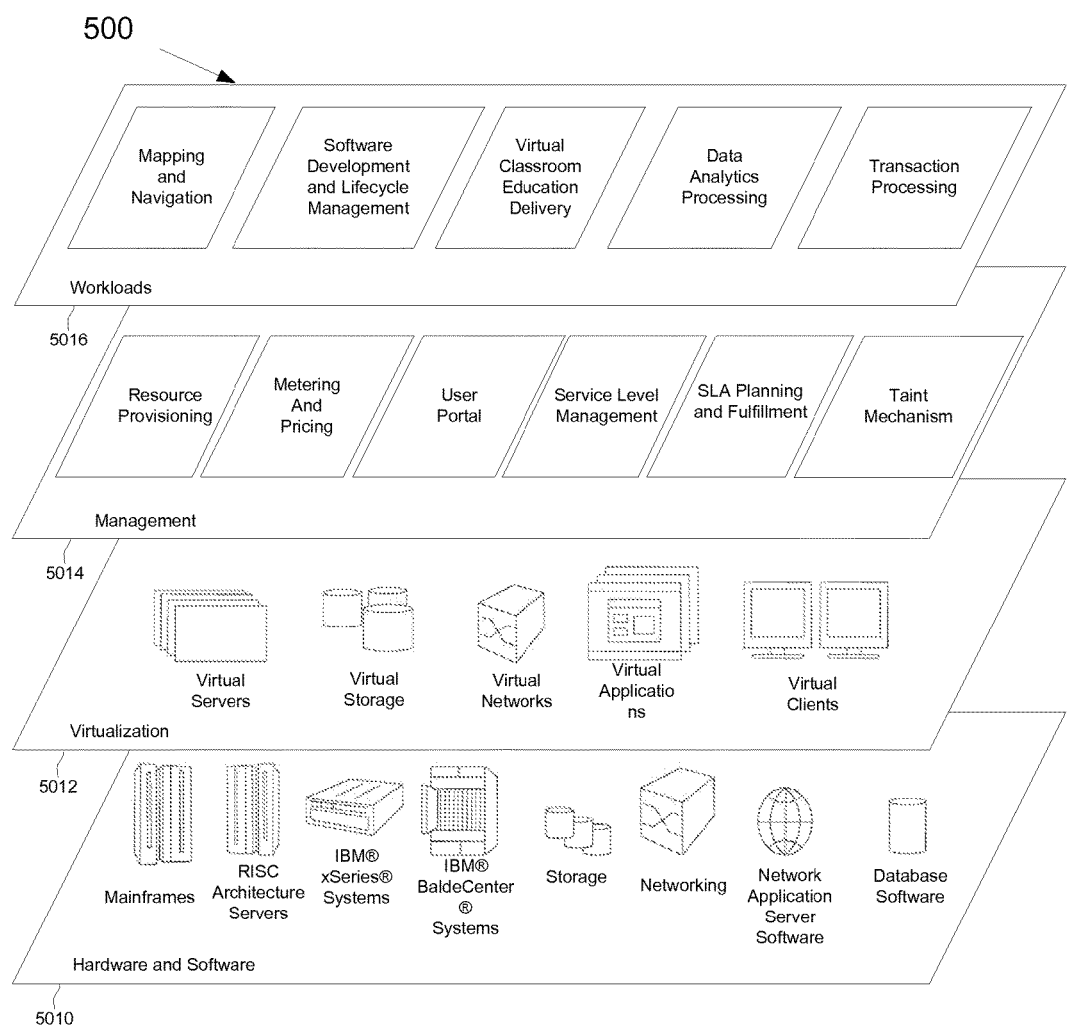
FIG. 5 is a block diagram of functional layers of the illustrative cloud computing environment of FIG. 4, in accordance with an embodiment of the present disclosure.

Referring now to FIG. 5, a set of functional abstraction layers 500 provided by cloud computing environment 400 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 5010 includes hardware and software components. Examples of hardware components include: mainframes; RISC (Reduced Instruction Set Computer) architecture based servers; storage devices; networks and networking components. In some embodiments, software components include network application server software.

Virtualization layer 5012 provides an abstraction layer from which the following examples of virtual entities may be provided: virtual servers; virtual storage; virtual networks, including virtual private networks; virtual applications and operating systems; and virtual clients.

In one example, management layer 5014 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. A Taint Mechanism Program may manage messages associated with an online messaging systems.

Workloads layer 5016 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for managing a plurality of messages associated with an online messaging system, the method comprising:
   receiving a message from a messaging source;
   determining whether the messaging source associated with the received message is trusted, wherein determining whether the messaging source associated with the received message is trusted includes determining whether the received message was digitally signed by an application with a chain of trust;
   tagging the received message and storing the received message, wherein the tagging and the storing is based on the determination that the messaging source is not trusted and not digitally signed;
   in response to determining the tagged and stored message can be validated, validating the tagged and stored message;
   sending the validated message to the online messaging system; and
   in response to determining the tagged and stored message can not be validated and the online messaging system is allowed to receive an unvalidated message, untagging the stored message and sending the unvalidated message to the online messaging system.

2. The method of claim 1, wherein the messaging source comprises at least one of a network connection, an application, and an input queue.

3. The method of claim 1, wherein determining whether the messaging source associated with the received message is trusted comprises determining whether an attribute associated with the received message has been set to flag the received message as being sent from an untrusted source.

4. The method of claim 3, wherein the setting of the attribute associated with the received message is either manually set by an administrator or automatically set according to a plurality of predetermined criteria identifying a plurality of untrusted sources.

5. The method of claim 1, wherein the tagging of the received message comprises storing a taint flag in a field in a header associated with an application messaging payload for a plurality of data associated with the received message or storing a taint flag in a plurality of metadata associated with the received message.

6. The method of claim 1, wherein storing the received message comprises storing the received message in a data store or a repository.

7. The method of claim 1, wherein validating the received message further comprises:
   determining whether it is possible to sanitize or to verify the received message is safe;
   determining whether to maintain or unset the tagging of the received message based on the determination that is possible to sanitize or to verify the received message is safe; and
   sending the received message back into the online messaging system based on the determination that is possible to sanitize or to verify the received message is safe.

8. A computer system for managing a plurality of messages associated with an online messaging system, the computer system comprising:
   one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:
   receiving a message from a messaging source;
   determining whether the messaging source associated with the received message is trusted, wherein determining whether the messaging source associated with the received message is trusted includes determining whether the received message was digitally signed by an application with a chain of trust;
   tagging the received message and storing the received message, wherein the tagging and the storing is based on the determination that the messaging source is not trusted and not digitally signed;
   in response to determining the tagged and stored message can be validated, validating the tagged and stored message;
   sending the validated message to the online messaging system; and
   in response to determining the tagged and stored message can not be validated and the online messaging system is allowed to receive an unvalidated message, untagging the stored message and sending the unvalidated message to the online messaging system.

9. The computer system of claim 8, wherein the messaging source comprises at least one of a network connection, an application, and an input queue.

10. The computer system of claim 8, wherein determining whether the messaging source associated with the received message is trusted comprises determining whether an attribute associated with the received message has been set to flag the received message as being sent from an untrusted source.

11. The computer system of claim 10, wherein the setting of the attribute associated with the received message is either manually set by an administrator or automatically set according to a plurality of predetermined criteria identifying a plurality of untrusted sources.

12. The computer system of claim 8, wherein the tagging of the received message comprises storing a taint flag in a field in a header associated with an application messaging payload for a plurality of data associated with the received message or storing a taint flag in a plurality of metadata associated with the received message.

13. The computer system of claim 8, wherein storing the received message comprises storing the received message in a data store or a repository.

14. The computer system of claim 8, wherein validating the received message further comprises:
 determining whether it is possible to sanitize or to verify the received message is safe;
 determining whether to maintain or unset the tagging of the received message based on the determination that is possible to sanitize or to verify the received message is safe; and
 sending the received message back into the online messaging system based on the determination that is possible to sanitize or to verify the received message is safe.

15. A computer program product for managing a plurality of messages associated with an online messaging system, the computer program product comprising:
 one or more computer-readable storage devices and program instructions stored on at least one of the one or more tangible storage devices, the program instructions executable by a processor, the program instructions comprising:
 program instructions to receive a message from a messaging source;
 program instructions to determine whether the messaging source associated with the received message is trusted, wherein determining whether the messaging source associated with the received message is trusted includes determining whether the received message was digitally signed by an application with a chain of trust;
 program instructions to tag the received message and store the received message, wherein the tagging and the storing is based on the determination that the messaging source is not trusted and not digitally signed;
 in response to determining the tagged and stored message can be validated, program instructions to validate the tagged and stored message;
 program instructions to send the validated message to the online messaging system; and
 in response to determining the tagged and stored message can not be validated and the online messaging system is allowed to receive an unvalidated message, program instructions to untag the stored message and sending the unvalidated message to the online messaging system.

16. The computer program product of claim 15, wherein the messaging source comprises at least one of a network connection, an application, and an input queue.

17. The computer program product of claim 15, wherein determining whether the messaging source associated with the received message is trusted comprises determining whether an attribute associated with the received message has been set to flag the received message as being sent from an untrusted source.

18. The computer program product of claim 17, wherein the setting of the attribute associated with the received message is either manually set by an administrator or automatically set according to a plurality of predetermined criteria identifying a plurality of untrusted sources.

19. The computer program product of claim 15, wherein the tagging of the received message comprises storing a taint flag in a field in a header associated with an application messaging payload for a plurality of data associated with the received message or storing a taint flag in a plurality of metadata associated with the received message.

20. The computer program product of claim 15, wherein storing the received message comprises storing the received message in a data store or a repository.

\* \* \* \* \*